Figure 1:
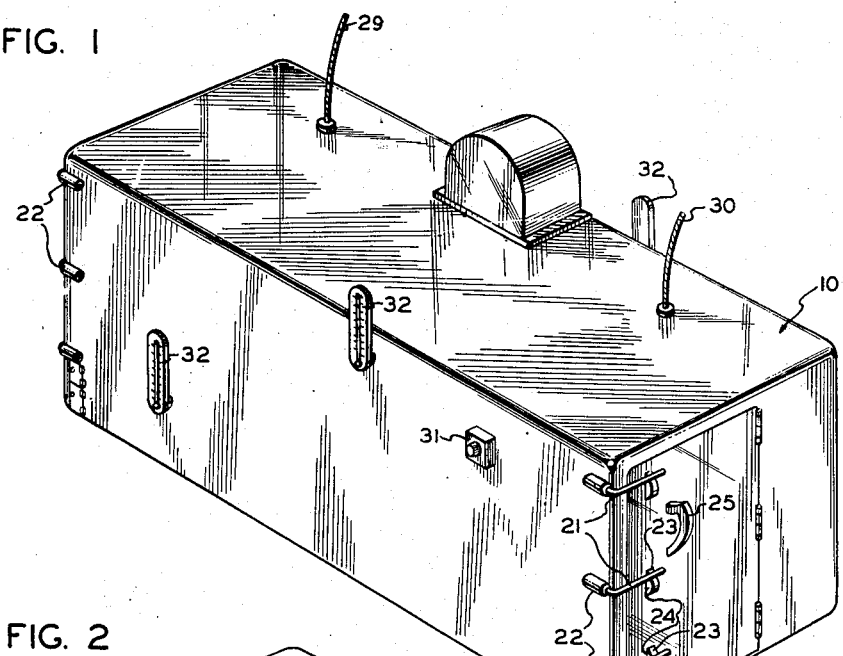

Oct. 6, 1953 N. A. LONG ET AL 2,654,162
APPARATUS FOR TREATMENT OF POLYAMIDE FABRICS
Original Filed Jan. 28, 1949 5 Sheets-Sheet 1

INVENTORS
N. A. LONG
L. T. CARTER
H. W. LINDLEY
L. B. STADLER
W. L. FOGLEMAN
BY
ATTY.

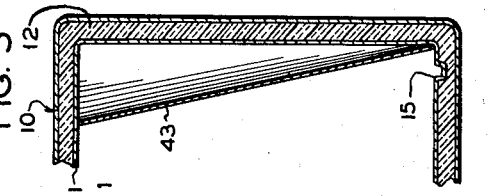
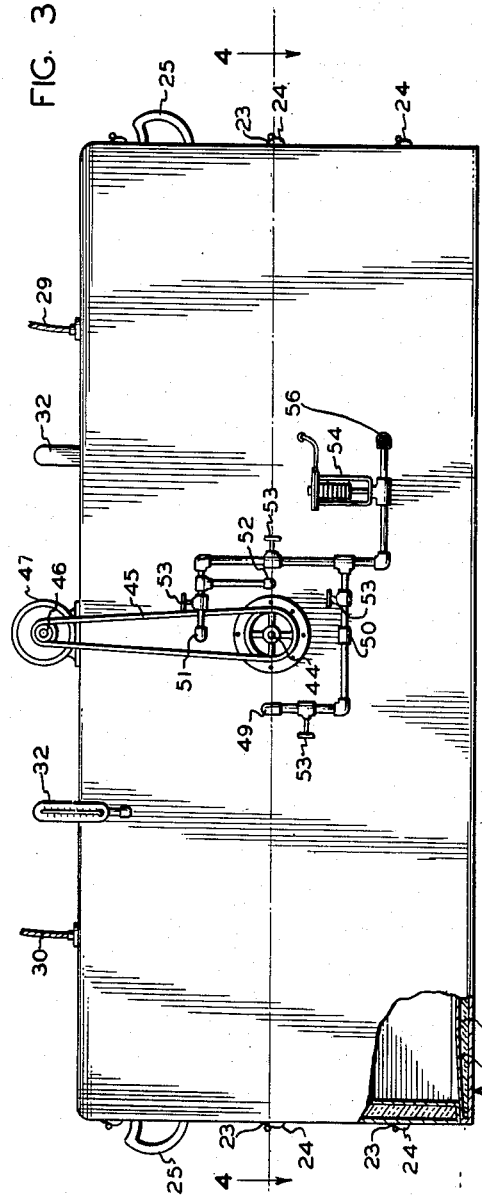
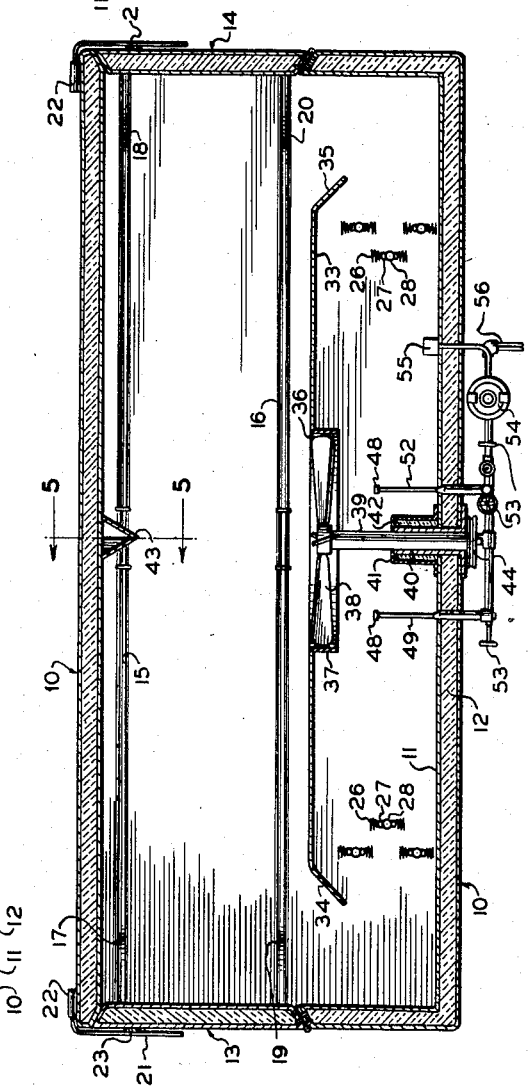
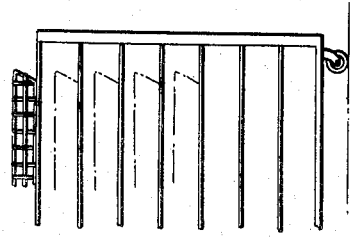
INVENTORS
N. A. LONG
L. T. CARTER
H. W. LINDLEY
L. B. STADLER
W. L. FOGLEMAN
BY A. Yates Dowell
ATTY.

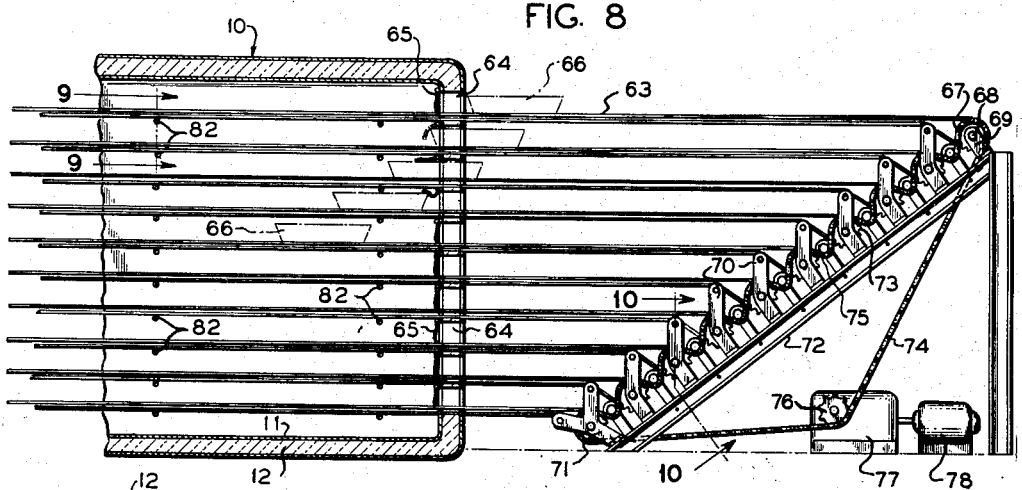
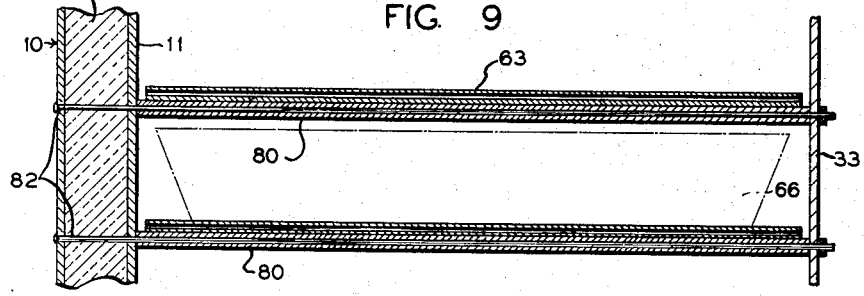
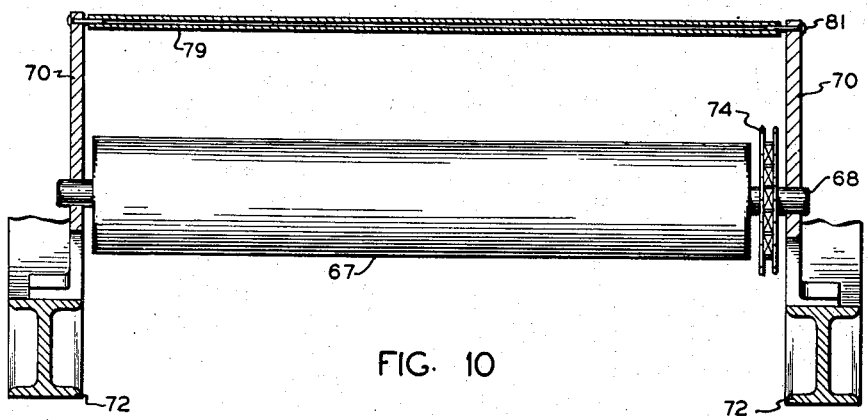

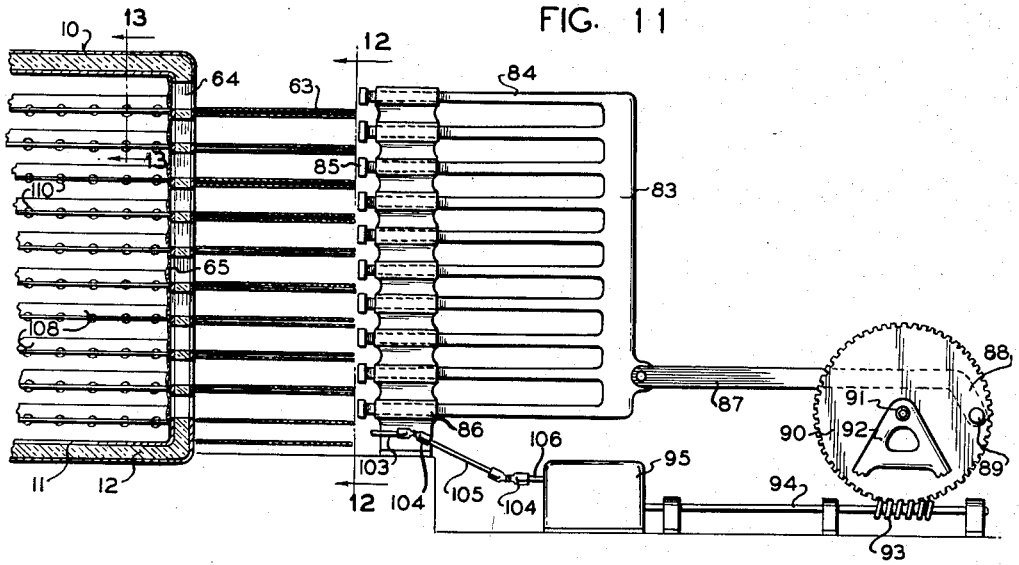
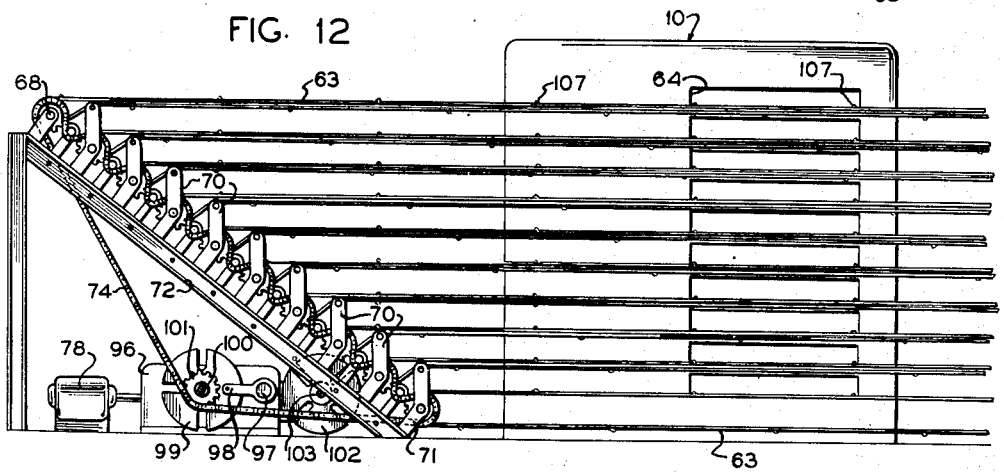
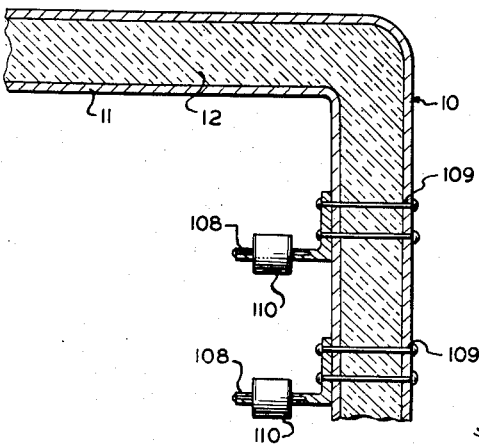

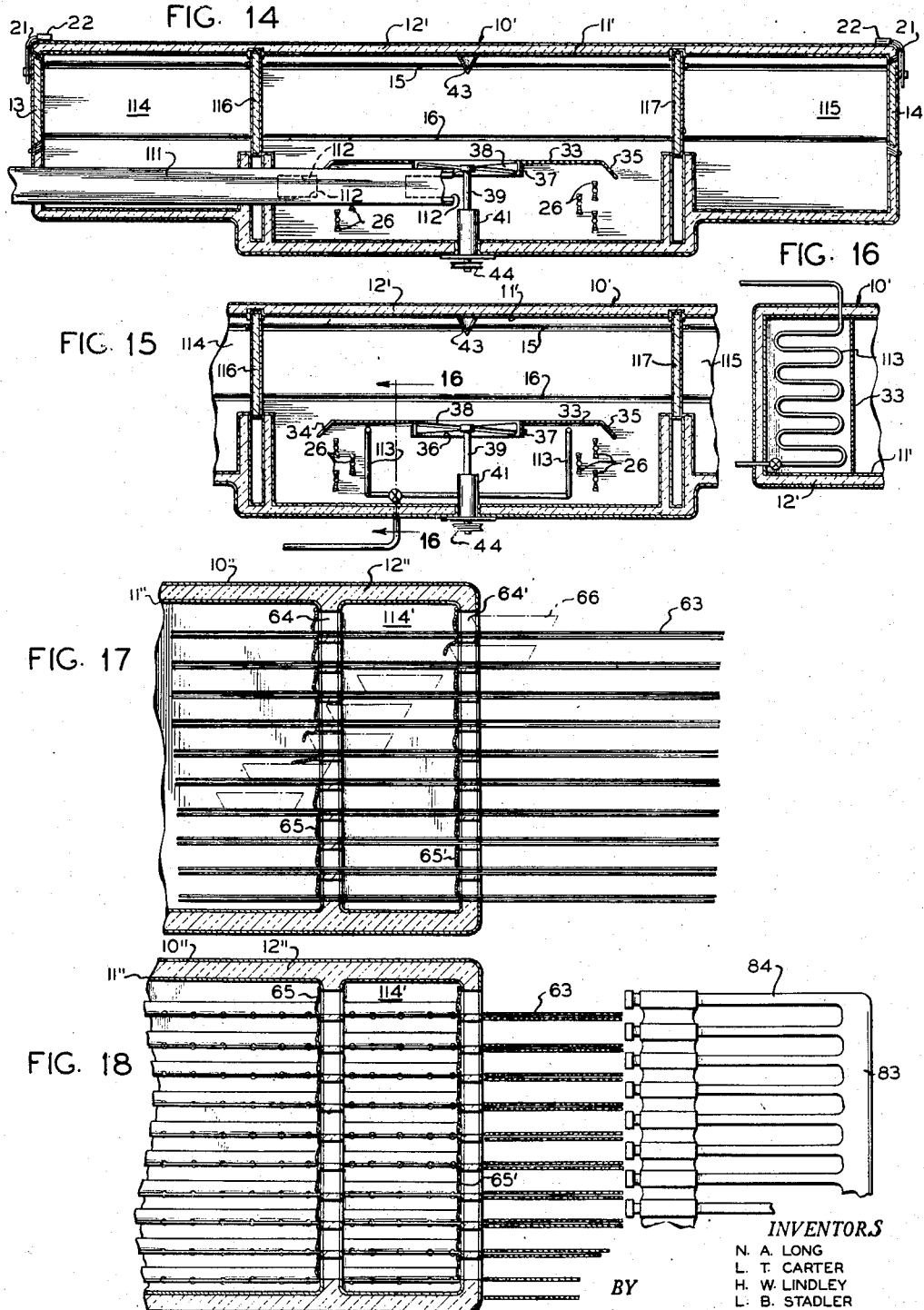

Patented Oct. 6, 1953

2,654,162

UNITED STATES PATENT OFFICE 2,654,162

APPARATUS FOR TREATMENT OF POLYAMIDE FABRICS

Nathan A. Long, Lawrence T. Carter, Harvey W. Lindley, Luther B. Stadler, and Walter Lindsey Fogleman, Burlington, N. C., assignors to Long Finishing Mills, Inc., Burlington, N. C., a corporation of North Carolina Original application January 28, 1949, Serial No. 73,282. Divided and this application July 18, 1950, Serial No. 175,422

6 Claims. (Cl. 34—204)

This invention relates to manufacturing processes and more particularly to the production of textile articles or fabrics comprising filaments spun from thermoplastic substances, such as synthetic linear condensation polyamides. Specifically, the invention relates to the finishing of articles of such material, including hosiery.

The present application is a division of an application filed January 28, 1949, for "Treatment of Polyamide Fabrics," Serial Number 73,282.

Heretofore, it has been customary to subject knitted articles, such as hosiery from the knitting mills, to a series of treatments to set the knitted crimp of the product as well as give it the desired color and shape. Heretofore this has generally been accomplished by manually placing the hosiery on forms or boards having the shape of the finished product and subjecting the boarded articles to a steam treatment. These boards or individual forms are customarily mounted on carriers with twenty-four of such forms to a carrier, requiring that the carrier and its associated boards be maintained stationary until all of the boards are filled, with consequent time lapse. It has been considered necessary to employ these boards or individual forms for holding hosiery in the desired shape during such steam treatment in order that a finished shape, which would be retained during subsequent treatments intended to further set and shrink the hosiery, might be imparted to the articles.

After the hosiery is placed on the boards or forms, the relatively heavy carrier is then manually moved into a retort or steam chamber and the hosiery is subjected therein to desired conditions of pressure and temperature for a predetermined length of time. A pressure frequently employed is 22 pounds per square inch with a temperature of 255° F. for a period of three minutes. Following this treatment the carrier with the hosiery is withdrawn from the steam chamber and the hosiery is manually removed from the boards, the preliminary or presetting treatment having been completed.

Thereafter the hosiery is placed in mesh bags, two dozen to a bag, and sent to the dyeing department for the dyeing and associated operations. In the process of dyeing, the hose are scoured, dyed and the finish added at a temperature of approximately 180° F. Following the dyeing process the hosiery are dried and subjected to a final treatment, again on boards or forms at a temperature or at a degree of heat greater than that employed in the presetting operation, after which the finished hose are ready for assorting and packaging for shipment. The manual boarding or mounting of the hosiery on individual forms, and the subsequent removal therefrom, is a time consuming operation which materially increases the expense of the process and the ultimate cost of the finished product.

In addition to utilizing steam at the above mentioned pressure and temperature, it has also been proposed to utilize steam at atmospheric pressure and at a temperature of approximately 212° F., in the presetting of fabrics of the nature being considered herein. Once again, in utilizing steam in these varying temperatures, the subsequent steps are accomplished at temperatures depending upon the results desired, the dyeing and scouring processes usually being carried out at approximately 180° F., while the final boarding and setting operation is carried out at a temperature higher than any temperature to which the fabric has been subjected in any of the prior treatments.

Such a process is disclosed in United States Letters Patent Nos. 2,333,160 and 2,350,021, granted to one George E. Dunn, wherein hosiery suspended in "a relaxed or unstressed condition" is subjected to a steam treatment "at or above 212° F., or at or below 212° F., to yield water vapor." Dunn further teaches that fabric wrinkles resulting from suspension in a condition other than that including a minimum of stress may be removed under a sufficiently high re-setting temperature, but stitch distortion resulting from such suspension is ordinarily irremediable.

It has also been proposed to present fabrics of this nature by subjecting the same either when in a stressed condition or in an unstressed condition, to the action of water vapor at a temperature of approximately 185° to 190° F. or, in some instances, particularly where the filament utilized is of appreciable size, the presetting may be accomplished by actual immersion in water. Once again, these presetting operations are followed by the usual scouring, dyeing and final setting steps.

Heretofore it has been considered necessary, in order to secure an adequate presetting of the fabric, to subject the same to a moisture treatment, whether the moisture be in the form of liquid, water vapor, steam at atmospheric pressure, or superheated steam under a positive pressure, and it has also been considered necessary to carry out the final boarding or setting step at a temperature higher than any temperature employed during the preceding operations. The final boarding or setting step has been utilized and is necessary in order to remove undesired wrinkles or the like, which may have been imparted to the fabric during the preceding steps and it has apparently been assumed that if these wrinkles were imparted at a particular temperature they could not be permanently removed without subjecting the fabric to a higher temperature. This, of course, materially limits the temperature which may be employed in the initial presetting operation since, if it is required that the final setting operation employ a temperature higher than any previously used, then such temperature is limited by the melting point of the fabric and consequently, the initial or presetting operation must be carried out at a sufficiently low temperature to permit the final setting operation to be carried out at a temperature well below the melting point.

It is also to be noted that in the processes heretofore employed, the fabric or articles will be removed from the presetting operation in an exceedingly damp or wet condition and since the temperatures employed during this operation are relatively high, the difficulty of handling the material is materially increased by its wet condition which will further serve to retain the heat imparted thereto for an appreciable period of time.

Among the objects of the invention, therefore, is the elimination of the first boarding operation, and in so doing not only simplifying the finishing of the hosiery after it is knitted, but accomplishing the finishing operations with a substantial saving in labor and material and accompanying reduction in cost, as well as providing an improved product.

Another object of the invention is to modify the finishing process in a manner to improve the article by reducing the shrinkage occurring during the initial step heretofore called the presetting step or operation, thereby effecting a substantial saving of material employed and otherwise providing a more satisfactory article.

A further object of the invention is to provide a finishing process for articles or fabrics comprising yarns spun from synthetic linear condensation polyamides which will result in a substantially duller finish, more closely resembling the appearance of natural silk.

A further object of the invention is to provide a process for setting fabrics of the character indicated by introducing the same in a dry condition into a chamber, the atmosphere of which is maintained under predetermined conditions of temperature, pressure and humidity, and removing the fabric therefrom after a predetermined period of time, still in a dry condition.

A further object of the invention is to provide a process for setting the knitted crimp of thermoplastic fabrics by subjecting the same to a dry heated atmosphere for a predetermined period of time.

A further object of the invention is to provide a process for setting the knitted crimp of articles such as hosiery knit from yarns spun from synthetic linear condensation polyamides by subjecting the same to a heated atmosphere to which a relatively small amount of moisture at natural temperature has been added.

A further object of the invention is to provide a process for finishing fabrics, or articles such as hosiery, knit from thermoplastic filaments, by subjecting the same to a crimp or stitch setting process carried out in a dry atmosphere at a predetermined temperature for a predetermined period of time, scouring and dyeing the fabric or article at a temperature well below the setting temperature, and subjecting the fabric or article to a finishing or shaping operation at a temperature in excess of the scouring and dyeing temperature but still below the setting temperature.

A further object of the invention is to provide a process for finishing fabrics, or articles such as hosiery, knit from synthetic linear condensation polyamide yarns, by subjecting the same to a setting operation in a heated atmosphere containing a relatively small quantity of moisture at a predetermined temperature and for a predetermined period of time, scouring and dyeing the fabric or article at a temperature well below the setting temperature, and subjecting the fabric or article to a final finishing operation at an increased temperature still below the setting temperature.

It is a further object of the invention to provide a process for setting the knitted crimp of fabrics or articles such as hosiery, formed from synthetic linear condensation polyamide yarns, but subjecting the same to a refrigerated atmosphere to perform the setting operation.

A further object of the invention is to provide a relatively simple, inexpensive and efficient apparatus for setting the crimp or stitch of fabrics or articles comprising yarns spun from thermoplastic compositions.

A further object of the invention is to provide an apparatus for setting fabrics or articles formed from thermoplastic filaments in which the fabric or article may be subjected to either an atmosphere of heated dry air, or a heated atmosphere containing any desired amount of moisture.

A further object of the invention is to provide an apparatus for setting the knitted crimp of fabrics or articles such as hosiery, formed from thermoplastic filaments, and incorporating means for automatically feeding such fabric or articles into the apparatus and removing the same therefrom.

A further object of the invention is to provide an apparatus for setting the crimp of hosiery knit from thermoplastic filaments by subjecting the same to a refrigerated atmosphere with means provided for maintaining a relatively high efficiency in the apparatus by substantially preventing the entrance therein of heat during introduction and removal of the fabric or articles being processed.

Another object of the invention is to improve methods of production with possible reductions in prices in order to stimulate purchasing and the employment of labor in manufacturing, a combination of desirable factors when there is a drop in sales and apparent necessity for price reduction, so as to make available to the purchasing public an article of lower price and improved quality without injuring the manufacturer but enabling him to continue to receive a fair margin of profit for his merchandise.

Figure 2:
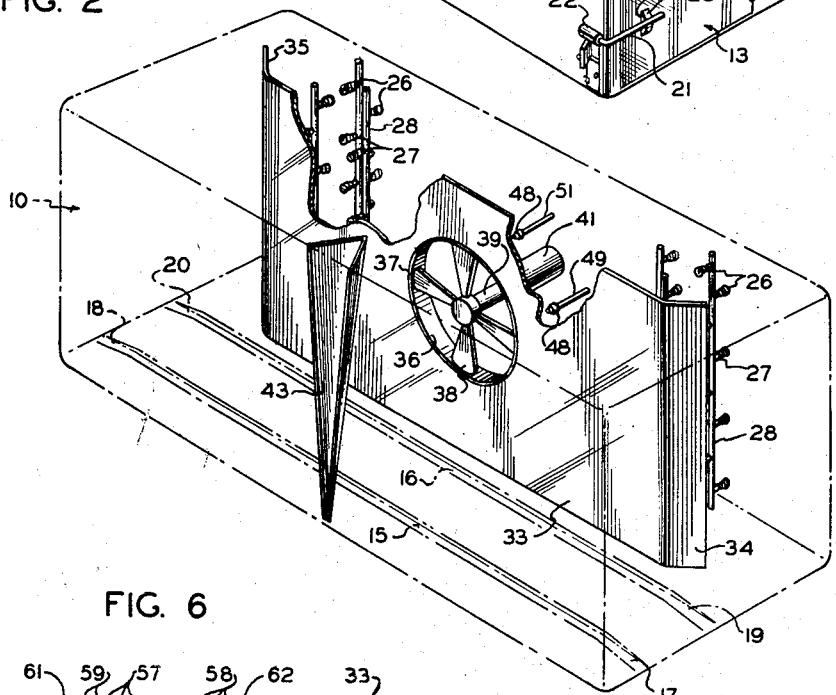
Figure 6:
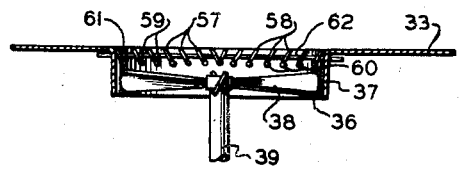

Further objects and advantages of the invention will be apparent from the following specification taken in conjunction with the accompanying drawings, wherein:

Fig. 1 is a perspective of a cabinet in which textile articles or fabrics formed from synthetic linear condensation polyamides are treated;

Fig. 2, a similar view with the cabinet indicated in phantom lines and with parts of the interior structure broken away;

Fig. 3, a rear elevation of the cabinet;

Fig. 4, a longitudinal section on the line 4—4 of Fig. 3;

Fig. 5, a transverse section on the line 5—5 of Fig. 4;

Fig. 6, a detail section of a modified form of air deflector for the fan;

Fig. 7, a fragmentary elevational view illustrating, somewhat diagrammatically, a vehicle or carrier utilized for introducing and removing articles to be treated from the apparatus;

Fig. 8, a fragmentary section showing a modified feeding means;

Fig. 9, a section on the line 9—9 of Fig. 8;

Fig. 10, a section on the line 10—10 of Fig. 8;

Fig. 11, a view similar to Fig. 8, showing a further modified feeding means;

Fig. 12, a section on the line 12—12 of Fig. 11;

Fig. 13, a section on the line 13—13 of Fig. 11;

Fig. 14, a longitudinal section of a modified form of cabinet;

Fig. 15, a fragmentary section similar to that of Fig. 14 illustrating a modified form of refrigeration;

Fig. 16, a section on the line 16—16 of Fig. 15;

Fig. 17, a vertical section of a modified form of cabinet of the conveying feed type; and, Fig. 18, a section similar to that of Fig. 17, illustrating a ram type feeding mechanism.

The process of setting the knitted crimp of textile fabric comprising elongated filaments spun from thermoplastic substances, more particularly the hosiery to which this invention relates, is performed in such a manner that the shrinkage occurring in the fabric during this operation is materially less than the shrinkage encountered in the usual commercial presetting processes. It has been found that the knitted crimp or stitches of such fabric may be advantageously set by subjecting the same to a dry heated atmosphere for a predetermined period of time, such a step resulting in the adequate setting of the fabric and, at the same time, the holding of the shrinkage thereof to a minimum.

Preferably the process of this application is performed by placing a quantity of hosiery knit from filaments spun from synthetic linear condensation polyamides, usually two dozen pairs, loosely in a container such as a shallow wire basket or the like, there being provided adequate safeguards to prevent snagging of the hosiery. The containers are then placed in a chamber having a dry heated atmosphere in which the air is maintained in circulation so that all of the hosiery is subjected to a substantially even treatment. After being subjected to this atmosphere for a sufficient period of time, the containers are removed and the hosiery subjected to subsequent operations such as scouring, dyeing and final finishing or shaping. It has also been found that, if desired, a predetermined and relatively small amount of moisture may be added to the atmosphere in the chamber, this moisture being preferably at natural temperature and being introduced in the form of very fine atomized spray. The addition of such moisture does not act to raise the moisture content of the fabric but rather limits or retards the drying or rate of drying thereof by the heated atmosphere.

The time interval during which the fabric is subjected to the crimp or stitch setting operation is determined by the denier of the fabric and the nature of the linear condensation polyamide, and in the case of 15 denier hosiery, a satisfactory time interval has been found to be approximately 15 minutes. In setting this grade of hosiery, a desired quantity, for example two dozen pairs, is loosely placed in perforated containers, these containers are then introduced into a treating chamber either on a truck or the like, or are fed therethrough in timed relation by conveyors or the like. The temperature of the chamber is maintained between the range of 260° and 270° F., for the time interval above referred to, after which the hosiery is removed and scoured and dyed at a temperature of approximately 155° F. Upon completion of the scouring and dyeing steps, the hosiery is subjected to a boarding or finishing operation at a temperature of approximately 255° F., which, it is to be noted, is below the temperature at which the setting operation was carried out and substantially above the temperature of the scouring and dyeing.

The setting of hosiery of linear condensation polyamides under the above conditions results in materially less shrinkage of the same than that occasioned by presetting in accordance with presently known processes in the presence of steam or in an atmosphere containing a relatively large quantity of moisture and by this process it will be seen that a minimum amount of raw material is necessary to produce articles of a given size.

Under certain conditions it may be desirable to retard drying of the fabric during the setting operation and this may be conveniently accomplished by introducing a predetermined and limited amount of moisture into the atmosphere of the treating chamber. It has been found desirable that this moisture be introduced in the form of an exceedingly fine atomized spray of water at natural temperature, i. e., normal temperature of the water in city mains. The actual quantity of moisture introduced is relatively small and does not serve to increase the moisture content of the fabric but controls the rate or extent of drying of the fabric whereby a product having minimum shrinkage is obtained. The subsequent steps of scouring, dyeing and final finishing are performed as above described.

Since the setting operation of this application is essentially a curing process including treatment of a nature to dehydrate, it has been found that this may be performed also by subjecting the fabric to a refrigerated atmosphere maintained at a temperature substantially below the dew point whereby the desired treatment may be provided. The time interval to which the fabric is subjected to this refrigerated atmosphere depends on the character and size of the polyamide filaments and on the amount of moisture desired to be removed.

The length of time to which the fabric is subjected to the treating atmosphere for setting the same is determined largely by the weight or denier of the fabric, the example given above being for purposes of illustration only, and not to be considered as in any way limiting the invention.

The process described herein is relatively simple and may be performed with minimum apparatus, the fabric resulting therefrom being of superior quality. A further important feature of this invention results from the fact that the fabric is introduced into the setting chamber in a dry state and is removed therefrom in a like condition, thus eliminating any necessity for handling extremely hot articles which will retain heat for a considerable period of time. In the instant process the fabric cools rapidly and may be conveniently handled immediately upon removal from the setting chamber, without the necessity of taking special precautions.

It is also to be noted that applicant's process contemplates the use of a relatively high temperature during the crimp or stitch setting operation, the subsequent steps being accomplished at temperatures materially lower than that of the setting temperature, resulting in the elimination of any possibility of shrinkage subsequent to the original setting operation.

With continued reference to the drawings, and having described the process, attention will now be given to the apparatus, wherein a cabinet is provided comprising outer and inner walls 10 and 11, respectively, having insulation 12 therebetween, such walls forming the top, bottom, front, back, and end walls of the cabinet, with a pair of access openings in the end walls closed by doors 13 and 14.

The inner and outer walls are preferably porcelainized on their surfaces or given such other finishing treatment as may be desired, and may be fabricated and assembled in sections or in any other suitable manner.

The floor of the inner shell or wall 11 is preferably provided with equally spaced longitudinal grooves or depressions 15 and 16 forming channels or runways, channel 15 having end portions 17 and 18 of tapering depth, and channel 16 having end portions 19 and 20, also of tapering depth, such channels serving to guide a vehicle or carrier containing articles to be treated.

The doors are fastened by means of swinging latches or locking dogs 21 journalled in supporting sleeves 22 on the outer wall or shell of the cabinet. The doors are provided with wedge shaped striker members 24 having inclined surfaces 23 on which the arms of the latches ride for securely fastening the doors in closed position. If desired, each door may be provided with one or more handles 25, for convenience in opening and closing.

The interior of the above described cabinet forms a suitable chamber for the treatment of hosiery or fabrics of synthetic linear condensation polyamides, or the like.

In order to perform the necessary treating operations, the cabinet may be heated or cooled, moisture may be introduced or removed, air from the exterior may be admitted or allowed to enter, and air within the cabinet may be vented. Circulation of air under controlled conditions is possible within the cabinet and preferably the various elements of the device are subjected to appropriate controls.

The cabinet may be supplied with heat in a number of ways, as for example, by the utilization of a plurality of removable heating elements 26 threaded or otherwise mounted in screw sockets 27 on supporting posts 28, eight of such heating elements being carried by each of said posts, with four on each side of the same. While any desired number of heating elements may be employed in accordance with the requirements, six posts have been illustrated carrying a total of forty-eight heating elements, with three of such posts carrying 24 of such heating elements positioned adjacent the rear of each end of the cabinet. Electrical energy may be supplied to said heating elements from an external source, not shown, through conductors 29 and 30 and the operation of the heating elements may be controlled in any desired manner. As for example, by means of a thermostat 31 which, for accurate control, may have one or more thermostatic bulbs disposed in desired locations within the cabinet. Likewise, for observation of temperature conditions in various parts of the cabinet, visual indicators or gauges 32 may be disposed in spaced locations about the cabinet but clearly visible from the exterior thereof.

Means is provided for uniform distribution of heat from the heating elements 26 within the cabinet as well as for protecting material being treated from the direct heat from such heating elements. A preferred embodiment of such means includes a baffle 33 extending from the bottom to the top of the cabinet and having end portions 34 and 35 each disposed at an angle to the body of the baffle for deflecting or directing heat around the end of the same. The baffle 33 is provided intermediate its length and height with a circular opening 36 in which is mounted a sleeve section 37 which forms a shroud or casing for an air circulating fan 38 mounted upon a shaft 39. The shaft 39 extends through the rear wall of the cabinet and is mounted in a journal 40 housed in a casing 41 containing insulating material 42 for protecting the bearing and its lubricant from the heat within the chamber. When the fan is in operation, air will be directed forwardly and in order to cause it to be divided and portions of the air caused to travel to the right and to the left, a V-shaped baffle 43 which tapers from the top to the bottom, is mounted against the inner side of the front wall of the cabinet. In its movement air will be propelled against the baffle 43 where it will be divided and part will move to the right and part to the left towards the ends of the chamber, thence around the guiding or deflecting end portions 34 and 35 of the baffle 33, and into direct engagement with the heating elements 26. The temperature of the air will thus be raised by the heat imparted thereto from the heating elements and the air will then move into position to be recirculated by the fan.

In order to drive the fan, that portion of the fan shaft 39 which projects externally of the rear wall of the casing may be provided with a pulley 44, driven by a belt 45 from the pulley 46 of a motor 47.

Hosiery knit from filaments spun from synthetic linear condensation polyamides may be given a treatment in the cabinet comparable to conventional preboarding by subjecting the same to a processing including heat drying with vastly superior results. This may be attributed to the amount of moisture in and on the surface of the filaments as well as to the oily deposit found on such material in the greige, as received from the knitting mill. If desired, delay in the conditioning process may be accomplished by the addition of moisture to the air within the chamber. Such additional moisture may be accomplished by means of a plurality of spray nozzles 48 or in any other desired manner. The nozzles 48 may be supported upon pipes 49, 50, 51 and 52, respectively, each pipe being slightly reduced adjacent the nozzle as shown. Hand valves 53 are provided for the individual manual control of the supply. If desired, a humidistat 54 may be employed for maintaining the proper humidity of the air within the chamber, such humidistat having its operative element 55 located on the interior of the cabinet as illustrated.

Water, when needed, may be supplied through a pipe 56 from a city supply line.

In actual practice four spray nozzles have been employed, two of these nozzles having a capacity of four and one-half gallons per hour while the capacity of the remaining two nozzles is but three gallons per hour. These ratings are at a pressure of one hundred pounds per square inch while the normal city water pressure is but sixty pounds per square inch, thus reducing the intake by 40%. It is to be noted, however, that the precise quantity water, or moisture, admitted into the chamber is not critical, no appreciable changes in either temperature or humidity occurring, the presence of such moisture serving only to retard the drying process, with a slight increase in shrinkage, as will be hereinafter more fully discussed.

Instead of providing a baffle such as the baffle 43 in the chamber against the front wall of the cabinet, air directing louvers 57 and 58 may be employed as illustrated more particularly in Fig. 6 of the drawings. These louvers are disposed in angular positions to direct air to the right and to the left and are preferably adjustable, being mounted upon pivots 59 and 60 and operative by means of manually adjustable rods or members 61 and 62. By the proper setting of the louvers the proper direction may be imparted to the air circulated by the fan 38.

Instead of the cabinet having a door at each end through which a vehicle may be propelled for supplying the cabinet with articles to be treated, and removing such articles, the treatment may be accomplished by a continuous process. In order to obtain this result a series of conveyors 63 may be caused to move through openings 64 in the end wall of the cabinet with preferably flexible closure flaps 65 serving to keep the openings closed except when articles to be treated and contained in a wire basket 66 are passing through such openings. Similar openings and closure flaps may be employed in the exit wall of the cabinet, the flaps attached to the exit wall preferably, although not necessarily, being attached to the exterior wall of the cabinet while those attached to the entrance wall preferably, although not necessarily, are attached to the interior wall of the cabinet.

The conveyors 63 preferably are mounted on a series of pulleys 67 on shafts 68 mounted on brackets 69, 70 and 71, all supported on a bar or frame 72. Each of the pulleys 67 also has associated with it a small sprocket 73 driven by chain 74 with alternate idlers 75. The chain 74 is driven through a sprocket 76 and a series of gears, not shown, in a housing 77, power being derived from the motor 78.

In the conveyor system, the upper and lower runs of each conveyor are mounted in close relationship and, in order to allow clearance for trays of articles between the lower run of a conveyor in close proximity to an upper run, a series of rollers 79 and 80 are employed, the former being mounted on pins 81 in the upper ends of the brackets 70 and 71 and the rollers 80 being mounted on bolts 82 which span the distance between the side wall of the cabinet and the longitudinal baffle 33, as shown more particularly in Fig. 9 of the drawings.

The trays or baskets 66, containing material to be treated, are placed on the endless conveyors 63 at the entrance end of the cabinet and will be carried into the cabinet by said conveyors. It will be noted, however, that with this construction the movement of the trays through the entrance and exit openings, as well as through the chamber or cabinet, will be gradual.

In lieu of the gradual movement of the trays through the cabinet during the treating process by means of the conveyors 63, the trays may be moved into the cabinet quickly by mechanical means as illustrated in Figs. 10 and 11. In this embodiment the conveyor belts 63 move at right angles to the direction of movement of the belts of Fig. 8 or transversely with respect to the cabinet so that trays may be pushed transversely of the belts through the openings 64 into the cabinet.

Suitable means are provided, with this form of apparatus, to mechanically push the trays from the belts into the cabinet 10. A preferred embodiment thereof comprises a ram 83 provided with arms 84 having enlarged heads 85 on their outer ends, such arms being supported in a multiple guideway 86. The ram 83 is driven by an arm 87 having an angular portion 88 connected by a pivot 89 to a gear 90 rotatably mounted on a bearing 91 carried by an A-frame 92. The gear 90 is driven from a worm 93 on a shaft 94 from a transmission 95. Power is supplied from a motor 78 and transmission box 96 to drive a shaft 97 on which is mounted a mating arm 98 for the Geneva gear 99 located on the shaft 100. Also mounted on the shaft 100 and keyed thereto is a sprocket 101 which drives the chain 74 and series of conveyors 63 through the mechanism previously described.

The arm 98 which engages the Geneva gear 99 also engages a second Geneva gear 102 mounted on a shaft 103 which latter shaft supplies power to the transmission 95 by means of a pair of universal joints 104 to drive intermediate shafting 105 and 106. The transmission 95 accelerates the transmitted speed so that one quarter of a revolution by the Geneva gear 102, will impart one complete revolution to the gear 90 thus imparting a complete forward and reverse movement to the ram 83. For proper cooperation between the ram and the trays the conveyor belts 63 may be provided with stops 107 or other means for locating the trays in proper position in relation to the rear end of the cabinet and in alignment with the openings in the cabinet, such openings being normally closed by the flaps 65 as previously described.

Other desired means may be employed for supporting the trays within the cabinet while the articles within the trays are being treated, as for example, spaced supporting members 108 which extend inwardly from each side of the cabinet and are secured in place by rivets 109. If desired such supporting means 108 may be provided with rollers or other anti-friction means 110 so that when the trays are fed into the cabinet they may be supported and will offer little resistance to their forward movement therethrough.

While efficient means for treating textile fabrics of the character mentioned has been described and in which heat is employed as a drying medium, if desired, refrigeration may be used in lieu of heat.

In utilizing refrigeration in the treating process, a cabinet 10' of the character heretofore described is utilized and is provided, as shown in Fig. 14, with a duct 111 disposed at the rear of the cabinet adjacent the top thereof for introducing refrigerated air, discharge openings or passages 112 being provided on the underside of this duct through which refrigerated air is discharged into the cabinet. This air will be circulated by the fan 38 as previously described and properly diverted by the vertical baffle 43 so as to circle the extremities of the longitudinal baffle 33.

Instead of air being brought into the cabinet by a duct, refrigerating coils 113 may be located in the cabinet, one coil preferably being located in the vicinity of each group of heating elements 26 so that the air will be blown directly into contact with the coils by the fan 38. The heating elements may then also be used at convenient times for quickly defrosting the coils.

In the use of refrigeration in the treating process any desired refrigeration system may be utilized to produce the required cooling effect. However, as disclosed in the drawings, in order to attempt to insulate the chamber in the cabinet against infiltration of heat laden air through the inlet and refrigeration loss through the outlet, while the articles to be treated are introduced into the cabinet or removed therefrom, a precooling room 114 may be employed at the entrance end and a discharge room 115 at the exit end for maintaining, as far as possible, a differential temperature between the chamber and the outside atmosphere. Such chambers are employed with the cabinet when it has large doors 13 and 14 through which trucks having trays of the product thereon are moved, or may also be used with the continuous process. In the embodiment in which trucks or carriers with trays of the product to be treated are moved into and from the cabinet, the cabinet 10' is preferably provided with slide type doors 116 and 117 in the inner chamber, as illustrated in Figs. 13 and 14, instead of the swinging type, so that the truck can be contained in the auxiliary chambers and the doors opened, which would not be the case in the small chambers if the doors were of the swinging type as illustrated in earlier figures. As shown in Figs. 17 and 18, a cabinet 10'' is provided with an auxiliary chamber 114', and the walls are provided with openings 64 and 64', which are closed by flaps 65 and 65'.

Fabrics or articles knit from yarns spun from synthetic linear condensation polyamides, where the knitted crimp or stitch has been set in accordance with the teachings of the present invention, have been found to have a markedly duller finish, more closely resembling that of real or natural silk rather than the extremely glossy appearance of synthetic fabrics. This is particularly true in connection with hosiery. Because of this objectionable factor it has become customary for wearers of hosiery of this character, known by the trade name of "nylon," to reverse the hose and wear them thus reversed, with the finished or the more shiny surface concealed. Comparative tests have disclosed that hosiery knit from synthetic filaments, where the stitch crimp has been set in accordance with the instant invention, are 40% duller than hosiery of identical material preset in accordance with present commercial methods or processes, that of Dunn et al. included, referred to above. This desirable dullness is identical on both sides of such hosiery and the reversed wearing thereof, with the rib of the full-fashioned seam exposed, is pointless.

It has further been found, in connection with hosiery knit from yarns spun from synthetic linear condensation polyamides where setting of knitted crimp is accomplished in accordance with this invention, that a better union is secured between welt and boot, with particular reference to uniformity in both color and finish. Different tone shadings, as indicated by ring-like gradations, are noticeably absent.

It has also been found that when hosiery of the character with which we are presently concerned are finished in accordance with the novel process disclosed herein, they present a flat wrinkleless surface as if freshly ironed, an ideal condition for boxing and for sale to the ultimate consumer. This is attributed to the fact that crimp setting and accompanying shrinkage, when heat is employed, is accomplished at a temperature not thereafter equalled, and the set of each stitch remains undisturbed.

Comparative tests with particular reference to shrinkage have been conducted. The hose employed in such tests were knit by one mill from yarns spun from a single variety of synthetic linear condensation polyamide. These hose were all knit from 15 denier filament, were 35'' in length with an expected maximum shrinkage of 2½'', and were in the greige just as ordinarily received from the knitting mill.

A dozen hose preboarded and finished in the usual commercial fashion, finished 7 at 32½'' and 5 at 33'', representing a loss of material by reason of shrinkage of 6.78%. It will be noted that but 41½% of the hosiery approximated the preferred length of 33''.

A dozen hose set under dry heat and then finished, the process being carried out in accordance with the present invention, finished 2 at 32½''; 6 at 33''; 3 at 33½''; and 1 at 34'', representing a loss of material by reason of shrinkage of 5.35%, or a saving over the usual commercial process of 1.43% in material. It will be noted that 50% of the hosiery approximated the desired length of 33'' and an additional 33⅓% was in advantageous excess of this length.

A dozen hose set under dry heat with the addition of atomized water spray at natural temperature to retard drying and then finished in accordance with the present invention, finished 1 at 32½''; 5 at 33''; 4 at 33½''; 1 at 34''; and 1 at 34½'', representing a loss of material by reason of shrinkage of 5%, or a net savings over known commercial processes of 1.78% in material. It will be noted that 41½'' of the hosiery approximated the desired length of 33'' and an additional 50% was in advantageous excess of this length.

No appreciable differences were discovered in the appearance of the hosiery as between the dry heat process and the modification utilizing water spray.

Comparative tests directed to a determination of the snag resistance of fabrics or hosiery in which the knitted crimp has been set in accordance with the present invention have also been conducted. The hose employed in such tests were knit by one mill from 15 denier filament spun from a single variety of synthetic linear condensation polyamide.

The samples were first washed by hand in lukewarm water, using a neutral soap. The specimens were then boarded and dried on a standard hosiery form of the character approved by the National Association of Hosiery Manufacturers. Four samples from each hose were then taken by means of double rings, keeping a uniform tension on the fabric to correspond with that imparted by the standard hosiery board. The specimens, held under tension, were then placed on a 5½'' diameter disc covered with sponge rubber and rotated for snag detection.

Snag resistance was determined by applying pressure on an adjustable snagging point kept in constant contact with the hosiery fabric being tested. The pressure on the snagging point was gradually increased for each revolution of the snag tester until snagging was detected. The greater the pressure required to produce a snag, the more snag resistant is the fabric being tested. In a test of this character, well known in this art, the minimum snagging factor has been set at 20.

The results of these tests were as follows:

Hosiery preboarded and finished in the usual commercial fashion disclosed a snagging factor of 20.9.

Hosiery in which the knitted crimp was set under dry heat in accordance with the present invention disclosed a snagging factor of 21.1, indicating a superiority of .95%.

Hosiery in which the knitted crimp was set under dry heat with the addition of atomized water spray at natural temperature to retard drying, disclosed a snagging factor of 21.4, indicating a superiority of 2.39% over the product commercially available.

It will be obvious from the foregoing that fabrics or hosiery knit from yarns spun from synthetic linear condensation polyamides and finished in accordance with the teachings of the present invention are vastly improved from the several points of view of economy of manufacture, improved appearance, and increased wearing qualities.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. In apparatus for setting the crimp of fabric knitted from a synthetic plastic filament, a chamber, inlet and outlet means in opposite end walls of said chamber whereby fabric to be treated may be moved into and out of the chamber, means for closing said inlet and outlet means, a vertically disposed baffle extending from the top to the bottom of said chamber over an appreciable portion of the length thereof and dividing said chamber into fabric treating and atmosphere conditioning compartments, air passages between the end walls of said chamber and the ends of said baffle, the ends of the baffle being angularly disposed and extending into said conditioning compartment, heating means in said conditioning compartment, air impelling means for forcing air through an aperture in said baffle, a vertically disposed and downwardly tapered angular baffle located on the wall of the treating compartment opposite the aperture in said first mentioned baffle whereby atmosphere circulated by said impelling means will diffuse through said treating compartment and be returned to said conditioning compartment so that fabric may be treated to set the crimp thereof, said inlet and outlet means providing access to and egress from said fabric treating compartment.

2. In apparatus for setting the crimp of fabric knitted from a synthetic plastic filament, a chamber, inlet and outlet means in opposite ends of said chamber whereby fabric to be treated may be moved into and out of said chamber in a predetermined path, means for closing said inlet and outlet means, a vertically disposed baffle extending from top to bottom of said chamber over an appreciable portion of the length thereof dividing said chamber into fabric treating and atmosphere conditioning compartments, air passages between the end walls of said chamber and the ends of said baffle, the ends of said baffle being angularly inclined and extending into said atmosphere conditioning compartment, heating means in said atmosphere conditioning compartment, air impelling means for forcing air through an aperture in said baffle, and a vertically disposed and downwardly directed tapered angular baffle disposed on the wall of said fabric treating compartment opposite the aperture in said baffle so that atmosphere circulated by said impelling means will diffuse through said fabric treating compartment and be returned to said atmosphere conditioning compartment whereby fabric positioned in said fabric treating compartment may be treated to set the crimp thereof.

3. An apparatus as defined in claim 2 in which the aperture in said baffle is provided with adjustable louvers for directing the flow of air under the action of the atmosphere impelling means.

4. An apparatus as defined in claim 3 in which means is provided in said atmosphere conditioning compartment for introducing moisture in the form of a finely divided atomized spray.

5. An apparatus as defined in claim 3 in which the heating means in said atmosphere conditioning compartment comprises a plurality of electrical heating elements.

6. An apparatus as defined in claim 2 in which flexible means are provided for closing the inlet and outlet openings of the chamber and conveyor means are provided for moving fabric to be treated into and out of the fabric treating compartment.

NATHAN A. LONG.
LAWRENCE T. CARTER.
HARVEY W. LINDLEY.
LUTHER B. STADLER.
WALTER LINDSEY FOGLEMAN.

References Cited in the file of this patent

UNITED STATES PATENTS

| Number | Name | Date |
| --- | --- | --- |
| 1,467,306 | Carrier | Sept. 11, 1923 |
| 1,513,932 | Rhoads | Nov. 4, 1924 |
| 1,642,473 | Wigglesworth et al. | Sept. 13, 1927 |
| 1,729,675 | Lecocq | Oct. 1, 1929 |
| 1,841,927 | Allsop | Jan. 19, 1932 |
| 2,017,728 | Oskamp | Oct. 15, 1935 |
| 2,297,318 | Parkes | Sept. 29, 1942 |
| 2,409,298 | Merrill | Oct. 15, 1946 |